United States Patent [19]
Suh

[11] Patent Number: 6,158,105
[45] Date of Patent: Dec. 12, 2000

[54] ASSEMBLY AND DISASSEMBLY OF A COMPUTER CASE HOUSING COMPONENTS OF A PERSONAL COMPUTER

[75] Inventor: Dong-ki Suh, Suwon, Rep. of Korea

[73] Assignee: SamSung Electronics Co., Esq., Suwon, Rep. of Korea

[21] Appl. No.: 08/903,836

[22] Filed: Jul. 31, 1997

Related U.S. Application Data

[62] Division of application No. 08/652,969, May 24, 1996, Pat. No. 5,823,644.

[51] Int. Cl.[7] ...................................................... B23P 11/02
[52] U.S. Cl. ........................ 29/453; 312/223.2; 361/725; 361/726
[58] Field of Search ................................ 29/426.1, 426.6, 29/453; 312/223.2, 333; 361/725, 726, 727

[56] References Cited

U.S. PATENT DOCUMENTS

| | | |
|---|---|---|
| 1,944,450 | 1/1934 | Myers . |
| 2,221,095 | 12/1940 | Jacobi . |
| 2,648,561 | 8/1953 | Landon . |
| 2,893,773 | 7/1959 | Clifton, Jr. . |
| 3,703,323 | 11/1972 | Gallas et al. . |
| 4,083,589 | 4/1978 | Palmerino . |
| 4,940,414 | 7/1990 | Lee . |
| 5,051,868 | 9/1991 | Leverault et al. . |
| 5,121,296 | 6/1992 | Hsu ............................................ 361/395 |
| 5,164,886 | 11/1992 | Chang . |
| 5,213,382 | 5/1993 | Dawdy et al. . |
| 5,269,598 | 12/1993 | Liu . |
| 5,321,962 | 6/1994 | Ferchau et al. . |
| 5,325,263 | 6/1994 | Singer et al. . |
| 5,406,809 | 4/1995 | Igelmund ........................................ 70/2 |
| 5,438,476 | 8/1995 | Steffes . |
| 5,446,618 | 8/1995 | Tetsuya et al. ........................... 361/726 |
| 5,447,044 | 9/1995 | Cheng ........................................... 70/58 |
| 5,547,272 | 8/1996 | Paterson . |
| 5,587,877 | 12/1996 | Ryan et al. . |
| 5,600,538 | 2/1997 | Xanthoploulos . |
| 5,785,398 | 7/1998 | Park .................................... 312/223.2 |
| 5,787,737 | 8/1998 | Cho .............................................. 70/58 |
| 5,813,793 | 9/1998 | Baucom ................................... 403/325 |
| 5,823,644 | 10/1998 | Suh et al. ............................. 312/223.2 |

*Primary Examiner*—David P. Bryant
*Assistant Examiner*—Jermie E. Cozart
*Attorney, Agent, or Firm*—Robert E. Bushnell, Esq.

[57] ABSTRACT

The present invention is a personal computer case that is easy to assemble and disassemble. The computer case can be separated into two members, the first covering the top, front, right and left sides of the case, and the second covering the bottom, front, and rear sides of the case. A push button operated latch enables one member to become detached from the other member, allowing the case to be opened, without requiring the use of screws or special tools. The push button contains a slidable detent feature that can prevent the button from being depressed, thus preventing the inadvertent disassembly, separation, and opening of the computer case. The case contains a security feature that involves attaching a padlock to a tab portion of one member that is slid through a hole in the other member. With the padlock attached, the tab can not be retracted from the hole, thus preventing the unwanted separation of the two members.

8 Claims, 6 Drawing Sheets

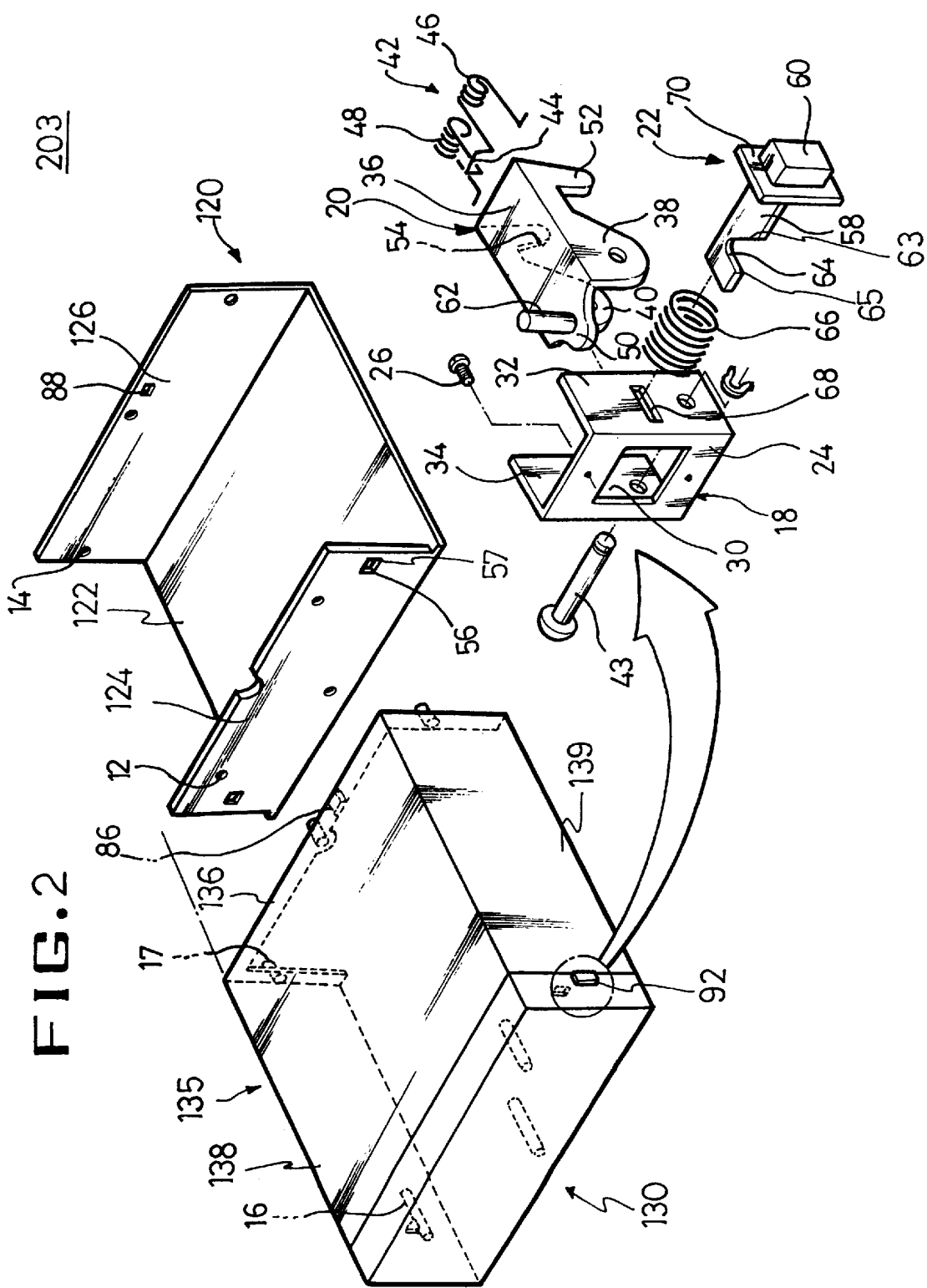

ASSEMBLY AND DISASSEMBLY OF A COMPUTER CASE HOUSING COMPONENTS OF A PERSONAL COMPUTER

CROSS-REFERENCE TO RELATED APPLICATIONS

This application makes reference to, incorporates the same herein, and claims all benefits accruing under 35 U.S.C. §119 arising from an application for *A Personal Computer with an Easy Assembly Structure* earlier filed in the Korean Industrial Property Office on Jun. 14, 1995 and there duly assigned Ser. No. 15756/1995. Also, this application makes reference to, incorporates the same herein, and claims all benefits accruing under 35 U.S.C. §120 arising from an U.S. application Ser. No. 08/652,969 now issued as U.S. Pat. No. 5,823,644 on Oct. 20, 1998 and filed on May 24, 1996 in which the instant application is a divisional application thereof.

FIELD OF THE INVENTION

The present invention relates to a personal computer, and more particularly to a main body case structure that is easy to assemble and disassemble, so that it becomes easier for a user to manipulate, and simpler for a manufacturer to make.

BACKGROUND OF THE INVENTION

U.S. Pat. No. 4,083,589 for a *Vehicle Security System* to Palmerino discloses a vehicle security system where the user pushes a push button to overcome a spring bias. This causes a piece monolithically integrated with the push button to translate in the same direction as the push button. An inclined surface on the monolithic piece of the push button, in contact with a second member, slides the second member by camming action, in a direction perpendicular to the direction of travel of the push button.

U.S. Pat. No. 2,648,561 for a *Push Button Latch* to Landon discloses a similar device as the one depicted in Palmerino. In Landon, a button is pushed, overcoming the resilient force of a spring bias, causing a member monolithically integrated to the push button to translate in the same direction as the push button causing an inclined plane located on the monolithic push button piece to move in the same direction as the push button. This inclined plane remains in contact with a second member, causing, by camming action, the second member to translate in a direction perpendicular to the first member and against a spring bias on the second member. The translation in the second member caused by the depression of the button on the first member frees a latch monolithically integrated on the second member from an aperture in a chassis part, allowing for the disassembly of the chassis.

U.S. Pat. No. 1,944,450 for a *Sash Control for Sliding Windows* to Myers describes a window sash control. In Myers, a push button is depressed, causing a monolithically integrated member to cam with a latch bar forcing the latch bar to pivot downward in a direction perpendicular to the push button motion and opposite the spring bias on the latch bar. By forcing the latch bar to pivot downward, a layer of weatherstripping is disengaged.

U.S. Pat. No. 2,221,095 for a *Door Locking and Latching Mechanism* to Jacobi describes a door locking and latching mechanism. In Jacobi, a push button feature is disclosed. When the push button is depressed, the member monolithically integrated with the push button travels in the same direction as the push button. A rotatable latch, in contact with the push button member, is rotated against a spring bias because of the force of the push button member. This rotation of the latch member against spring bias causes a hook, monolithically integrated to the pivotable latch member, to rotate out from an aperture of the structure allowing for the door to open.

U.S. Pat. No. 5,321,962 for an *Injector/Ejector Latch Lock Mechanism* to Ferchau et al. illustrates a sliding safety mechanism that prevents the operation of an unlatching mechanism on a computer console. A security lock prevents a trigger from rotating preventing a handle pivotably mounted on the chassis from unlatching the chassis parts preventing the disassembly of the chassis.

U.S. Pat. No. 2,893,773 for a *Latch and Detent Assembly* to Clifton describes a latch with a detent assembly for a door. The detent prevents the unauthorized unlatching of the door.

U.S. Pat. No. 5,213,382 for a *Locking Mechanism for Refuse Container* to Dawdy et al. discloses a locking mechanism where a control bar is pivotably mounted and contains a tab section having an aperture. A locking bar also contains a tab with an aperture. When the control bar is rotated to the latched position, the tabs of the control bar and the locking bar as well as the respective apertures align. A padlock may be inserted through the two holes when aligned preventing the subsequent unlatching of the container.

The above button operated latches have not been used in computer cases because of the availability of a less expensive alternatives, such as using screws. In the past, it was generally a service technician, rather than an operator, that opened computer cases. As a service technician would work on many computer cases in a single day, the service technician was equipped with specialized equipment to open and close a computer case and to fix the equipment. Today, it is more common for an operator to be required to open and close a computer case. Since an operator opens a computer case only occasionally, it is much more cumbersome for the operator to possess and use tools to accomplish this task. Thus, the latch mechanism would facilitate the opening and closing of the computer case for such an operator.

SUMMARY OF THE INVENTION

It is therefore an object of the present invention to provide a main body case of a personal computer which enables convenient assembling and disassembling and increases assembling efficiency which, as a result, improves productivity of the main body of the computer in the manufacturing process.

It is yet another object to provide a mechanism for disassembling of a computer case that requires a user to simply depress a button while pulling the cover unit off the base unit of the chassis.

It is still another object to provide a mechanism for assembling a computer case by simply sliding together top and bottom assembly members.

It is still yet another object to provide a detent mechanism that prevents the inadvertent disassembly and opening of a computer case by providing a mechanism for preventing a button from being depressed.

It is also an object to provide a security mechanism by providing for the use of a padlock to prevent the inadvertent opening and disassembly of a computer case.

These and other objects may be achieved by a personal computer having a bottom plate member where the components of the computer are mounted, and first and second plates erected respectively at front and rear portions of the bottom plate and monolithically integrated to the bottom plate, and a front-upper cover assembly including a front cover portion forming the front side of the computer and an upper cover portion covering upper, left, and right sides of the computer, thus completing the external appearance of the computer. In addition to the above enclosure, a push button operated locking mechanism is fixedly attached to the front upper cover assembly for engaging and disengaging the bottom plate assembly. Pushing the button causes, by camming action, a catching member to rotate, causing a hook on the catching member to rise from a catching edge of an aperture located on the first plate of the bottom plate assembly. The case also includes a sliding detent mechanism, which allows a knob, slidably attached to the front upper cover assembly near the button, to slide up to the button, causing a protruding tab on the knob to be inserted into a cavity in the button, thus preventing the button from being depressed and thus preventing the inadvertent disassembly and opening of the computer case. Lastly, the case includes a security mechanism having a tab, monolithically integrated with the front upper cover assembly and containing a first aperture for a padlock to lock onto at the extremity of the tab, so that when the tab is slid into a second aperture in the second plate of the bottom plate assembly, a padlock can lock onto the first aperture thus preventing the removal of the tab from the second aperture thus preventing the inadvertent and unwanted disassembly, separation, and opening of the computer case.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is an exploded perspective view of a computer case assembly in accordance with the principles of the present invention;

DETAILED DESCRIPTION OF THE INVENTION

A personal computer generally has a main body that contains a central processing unit, a memory unit, an auxiliary storage device, an input device such as a keyboard, and an output device such as a monitor. The main body completely encapsulates these components. Because the main body is generally not made of one monolithic piece, the case of the main body is formed by the assembly of a plurality of parts. The main body case of the personal computer is composed of a bottom plate on which various computer parts are mounted, an upper cover for covering and protecting the computer parts which are placed on the bottom plate, a front cover which decorates the front of the main body, and side and rear plates.

Figure 1:
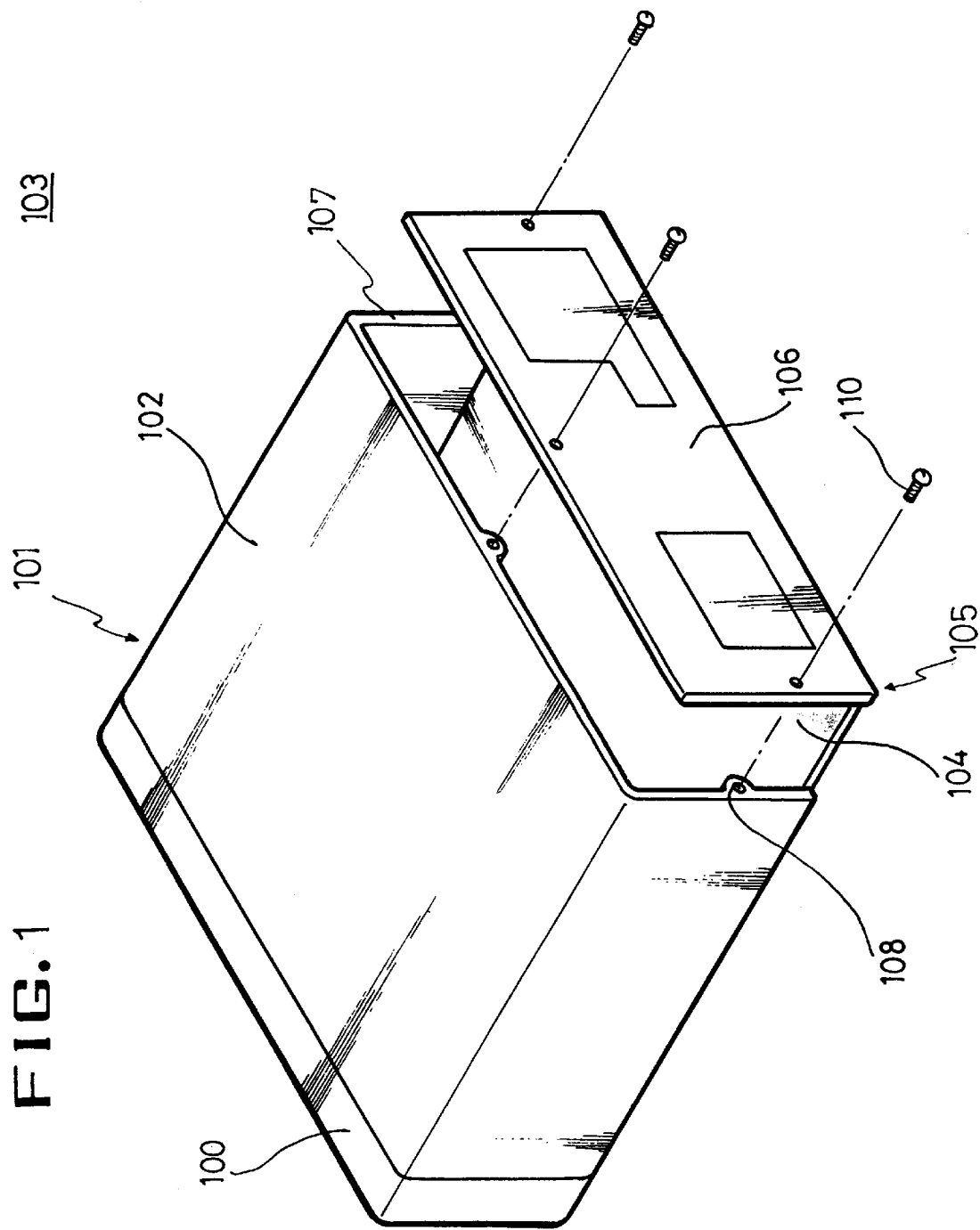
FIG. 1 is a drawing which shows the conventional computer case.

A conventional computer case as shown in FIG. 1. The assembly of the main body case is achieved by fixing the front cover 100 to the front part of the upper cover 102 so that they are formed integrally in one body as upper cover assembly 101, and then by combining the upper cover assembly 101 with the bottom plate assembly 105 made up of a bottom plate 104, a rear panel 106, and a front panel (not shown). The combining of upper cover assembly 101 with bottom plate assembly 105 is achieved by screwing rear plate 106, erected from the rear end of the bottom plate assembly 105, into screw holes 108 formed on rear flange 107 of upper cover assembly 101, by means of screws 110. Thus, assembly of a conventional computer case involves screwing together two monolithic units.

As a result, if a user wants to open the conventional computer case for interior repair or installation, the whole upper cover assembly 101 needs to be removed from bottom plate assembly 105. The drawback of the conventional computer case is that all the screws need to be loosened and screwed back in when assembling and disassembling the case. This is an inconvenient process as it is time consuming and creates a risk of losing screws. In addition, since every screw should be driven one by one in assembling the main body at the manufacturing process, productivity is greatly reduced due to the decrease of assembling efficiency.

FIG. 2 is an exploded perspective view of computer case 203 assembly according to the preferred embodiment of the present invention. As with conventional computer case 103, the present invention achieves complete encapsulation of the computer components by joining together two monolithically integrated parts, bottom plate member 120 and front upper cover assembly 130. Unlike the conventional computer case, the present invention does not use screws or tools to assemble or disassemble the computer case.

Bottom plate member 120 is a monolithically integrated part that contains bottom plate 122, first plate 124 in the front, and second plate 126 in the rear. The computer components are mounted on bottom plate 122. Front upper cover assembly 130 is a separate monolithically integrated part that contains front cover 134, upper cover 135, left side 138, right side 139, and rear flange 136 extending around the periphery of the rear side. When computer case 203 is assembled, front cover 134 is placed in front of first plate 124 making first plate 124 invisible to an external observer. Meanwhile, rear flange 136 is obscured to an outside observer by second plate 126 when computer case 203 is assembled.

Figure 3A:
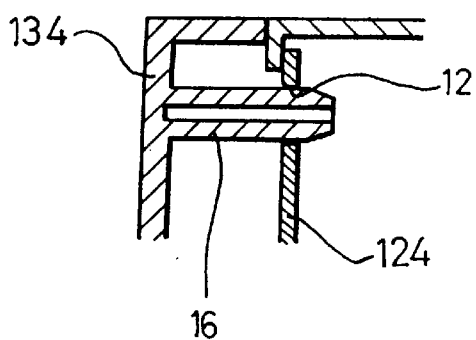
FIG. 3A is a sectional view showing a guide pin on the front cover connected to a guide hole of the first plate of the bottom plate member in accordance with principles of the present invention.
Figure 3B:
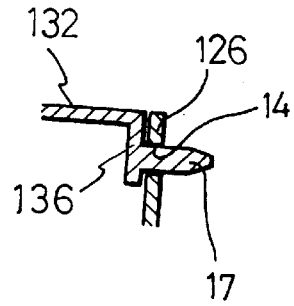
FIG. 3B is a sectional view showing a guide pin of the rear flange of the front upper cover assembly connected to a guide hole in the second plate of the bottom plate member in accordance with principles of the present invention.

When assembling computer case 203, in order to provide for a snug fit between bottom plate member 120 and front upper cover assembly 130, guide pins 16 on front upper cover assembly 130 are positioned to fit inside guide holes 12 in bottom plate member 120. During assembly of computer case 203, at least one guide pin 16 of front cover 134 of front upper cover assembly 130 is positioned to slide into corresponding guide hole 12 of first plate 124 of bottom plate member 120. See FIG. 3A in conjunction with FIG. 2. Simultaneously, at least one guide pin 17 of rear flange 136 of front upper cover assembly 130 is positioned to slide into corresponding guide hole 14 of second plate 126 of bottom plate member 120. See FIG. 3B in conjunction with FIG. 2. The result is a tight, snug fit between front upper cover assembly 130 and bottom plate member 120.

Figure 4:
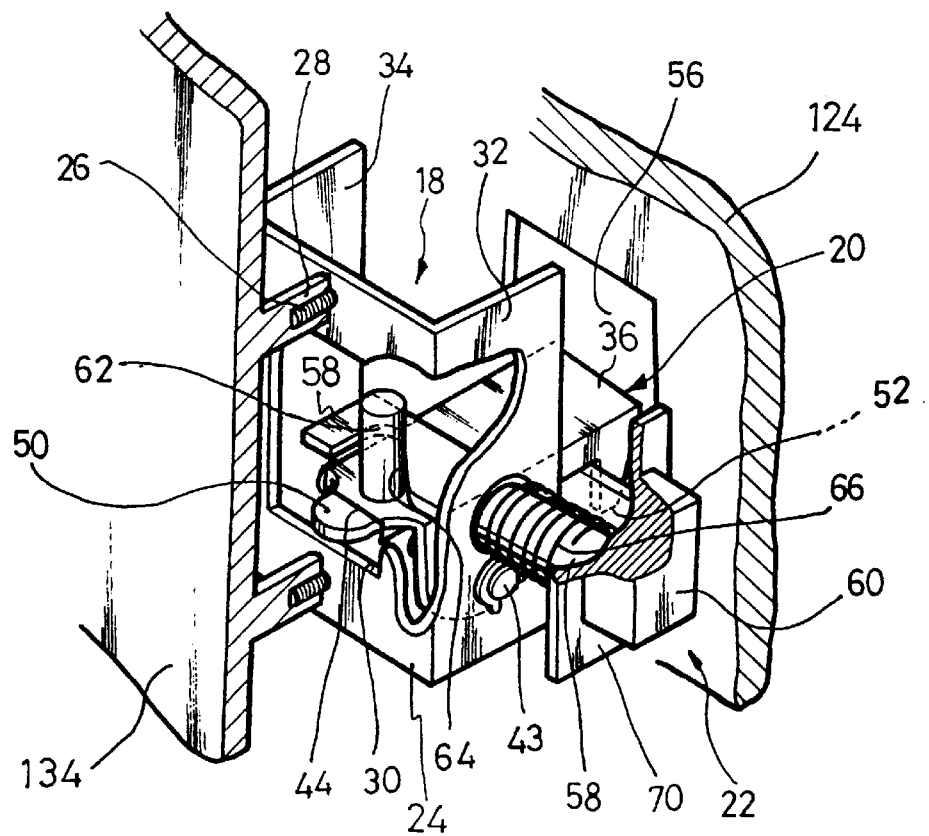
FIG. 4 is a fragmentary sectional perspective view showing the locking mechanism of principles of the present invention.
Figure 5:
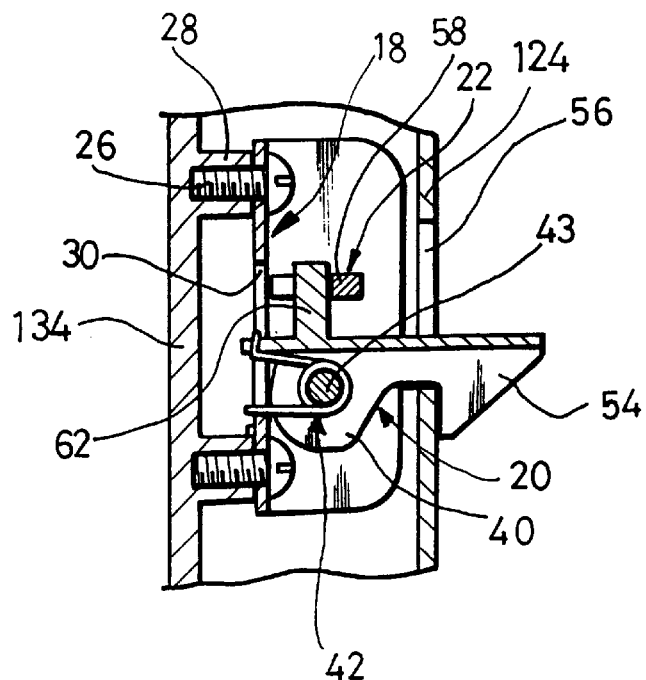
FIG. 5 is a sectional view showing the latched state of the locking mechanism in accordance with principles of the present invention.

Separate from the guide pins and guide holes already discussed, a locking mechanism for latching front upper cover assembly 130 to bottom plate member 120 is provided. Supporting member 18 for supporting pivotable latching member 20 is mounted on either the left or right side of the inside of front cover 134. Button member 22 for operating pivotable latching member 20 is shown in FIG. 4. Supporting member 18 includes plane portion 24 and side walls 32 and 34, and is fixed to bosses 28 projecting from the inside of the front cover 134 by means of fixing screws 26. Through hole 30 is formed in the central part of plane portion 24 of supporting member 18, and through which the front portion of pivotable latching member 20 is inserted. The size of through hole 30 is such that front projecting portion 50 of pivotable latching member 20 can vertically move to some degree.

Pivotable latching member 20 is rotatably fixed to the lower part of supporting member 18 between side walls 32 and 34. See FIG. 2. Pivotable latching member 20 includes plane portion 36 and side walls 38 and 40. The lower front portion of side walls 38 and 40 of pivotable latching member 20 are hinged to side walls 32 and 34 of supporting member 18 by means of hinge member 43. Elastic member 42 which upwardly forces the front end portion of pivotable latching member 20 is made up of a coil spring having winding parts 46 and 48 and connecting part 44 between winding parts 46 and 48, as shown in FIG. 2. Hinge member 43 passes through winding parts 46 and 48 while connecting part 44 is positioned near front projecting portion 50 of pivotable latching member 20. Connecting part 44 elastically supports the upper side of the front projecting portion 50. The free ends of elastic member 42 are elastically supported on a lower edge of through hole 30 of plane portion 24 of supporting member 18. Side walls 38 and 40 are upwardly concaved to form hooks 52 and 54 in the rear portion of pivotable latching member 20. Hooks 52 and 54 latch onto edge 57 of aperture 56 in first plate 124 of bottom plate member 120.

Figure 6:
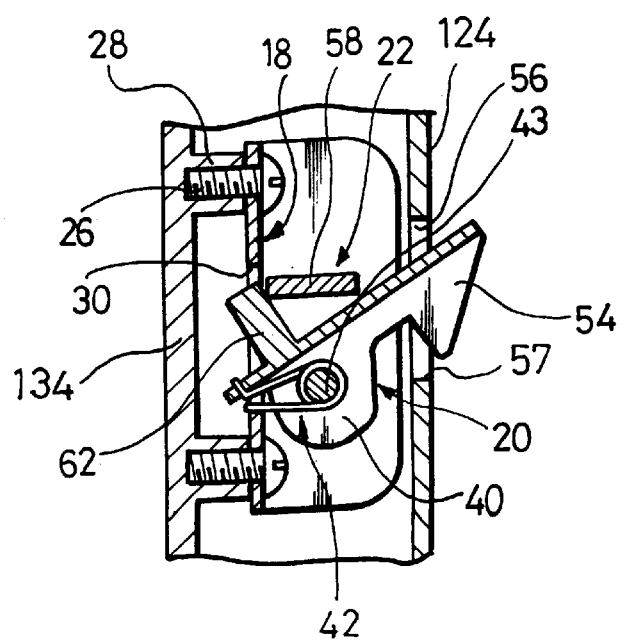
FIG. 6 is a sectional view showing the unlatched state of the locking mechanism in accordance with principles of the present invention.

Button member 22 for operating pivotable latching member 20 includes plane part 58 formed out of a rectangular shaped member in which catching groove 64 is formed to catch protrusion 62 of plane portion 36 of pivotable latching member 20. Button member 22 also includes button 60 located at an opposite end from plane part 58. See FIG. 2. Coil spring 66 biases button member 22 and button 60 outward while flange 70 surrounding button 60 prevents button member 22 from being ejected by coil spring 66 from case 203. Flange 70 is positioned just inside front cover 134, and since flange 70 is bigger than aperture 92, flange 70 succeeds in holding button member 22 in place inside aperture 92, thus preventing button member 22 from being ejected. Button member 22 is assembled so that plane part 58 passes through slot 68 formed on side wall 32 of supporting member 18, and so that catching groove 64 catches protrusion 62. Catching groove 64 is bounded by a catching edge 65 on the side of groove 64 furthest from button 60, and by inclined edge 63 on the side of groove 64 closest to button 60. When button member 22 is outwardly retracted, catching edge 65 of groove 64 catches protrusion 62 of pivotable latching member 20. When button 60 is pressed, inclined edge 63 of catching groove 64 of plane part 58 of button member 22 cams with protrusion 62 of pivotable latching member 20, causing the front portion of pivotable latching member 20 to rotate downward against the resilient force of elastic member 42. Rotation against the bias of elastic member 42 causes hooks 52 and 54 in the rear of pivotable latching member 20 to rise from edge 57 of aperture 56 of first plate 124 of bottom plate member 120, allowing front upper cover assembly 130 to be separated from bottom plate member 120. See FIG. 6. While button 60 is pressed, front upper cover assembly 130 can be removed from bottom plate member 120 by simultaneously pulling on front cover 134. This will cause guide pins 16 and 17 to withdraw from guide holes 12 and 14 respectively, separating front upper cover assembly 130 from bottom plate member 120. See FIG. 6.

Assembly of computer case 203 is achieved by first attaching the electronic computer components to bottom plate 122 of bottom plate member 120. Next, front upper cover assembly 130 is placed over bottom member 120 so that front cover 134 extends in front of first plate 124. Guide pins 16 and 17 are now aligned with guide holes 12 and 14 respectively, while pivotable latching member 20 is aligned with aperture 56. Front cover 134 and second plate 126 are squeezed together causing front cover 134 to move closer to first plate 124. As this occurs, guide pins 16 and 17 are inserted into guide holes 12 and 14 respectively while hooks 52 and 54 of pivotable latching member 20 cams with edge 57 of aperture 56 of first plate 124 of bottom member 120, causing the rear portion of pivotable latching member 20 to rotate upward while the front portion of pivotable latching member 20 rotates downward, causing hooks 52 and 54 of pivotable latching member 20 to slide into aperture 56 and to engage with edge 57 of bottom member 120, thus automatically latching front upper cover assembly 130 to bottom member 120.

Figure 7:
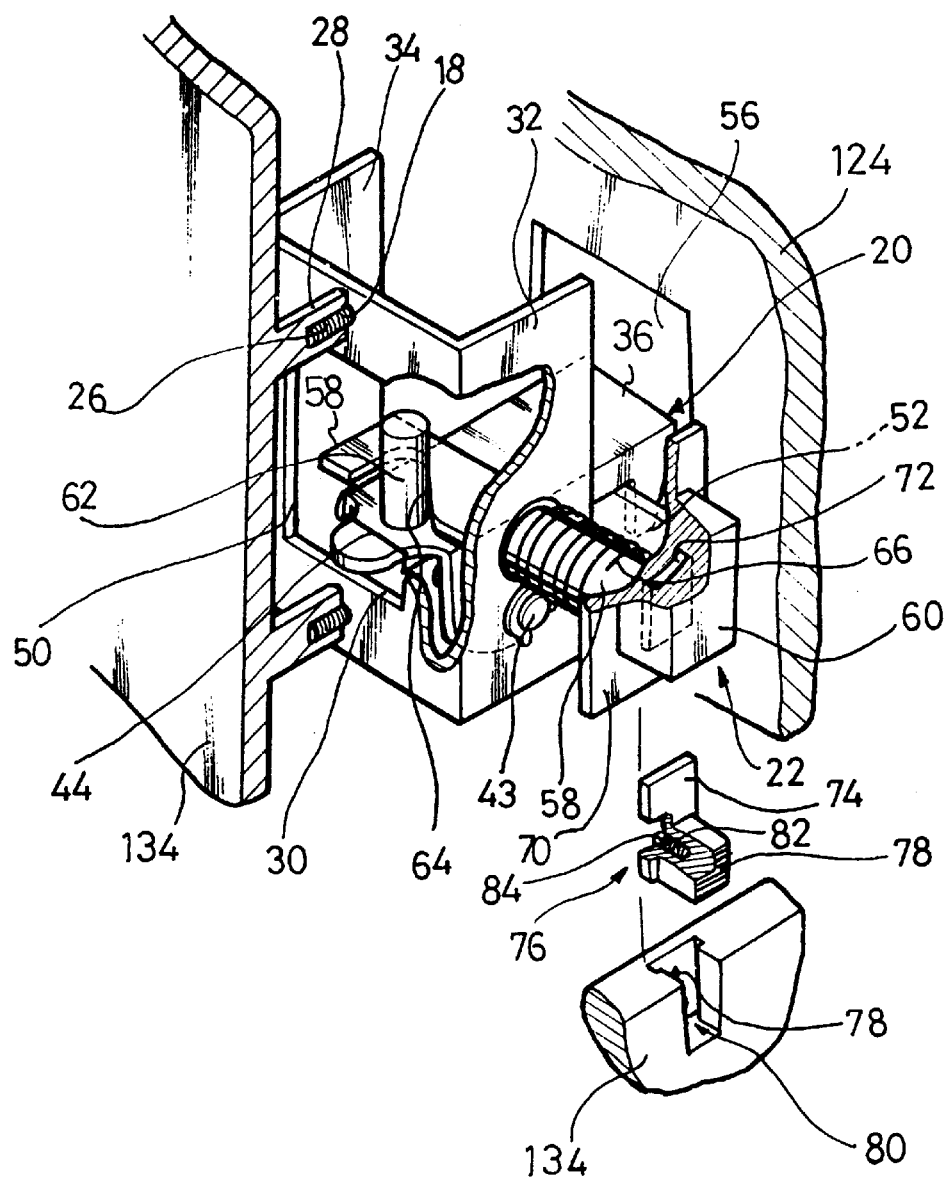
FIG. 7 is a fragmentary sectional perspective view showing the assembly structure of the front and upper cover for purpose of showing the slidable detent mechanism according to the first embodiment of the present invention.

FIG. 7 illustrates a first embodiment of this invention, showing a detent feature for button 60. The detent mechanism according to this embodiment consists of a monolithically integrated unit, called locking knob 76, slidably attached to slide groove 80 of front cover 134 of front upper cover assembly 130. Locking knob 76 can slide vertically along slide groove 80 of front cover 134 just beneath aperture 92, where button 60 protrudes. Locking knob 76 contains catching protrusion 74 on the upper side, and a gripping protrusion 78 on the lower side. Catching protrusion 74 extends upward parallel to the direction of sliding of locking knob 76, while gripping protrusion 78 extends outward, parallel to the direction of travel of button member 22. Inside gripping protrusion 78 is ball 84, and elastic member 82 to push ball 84 inside. Because ball 84 is always supported elastically on the inside of slide groove 78, ball 84 can prevent locking knob 76 from sliding downward inadvertently. Underneath the middle portion of button 60 is socket 72 which accommodates catching protrusion 74 when locking knob 76 is slid upwards towards button 60. Accordingly, after assembly of computer case 203, if locking knob 76 is raised, then catching protrusion 74 is inserted into socket 72, preventing button 60 from being pressed down.

Figure 8:
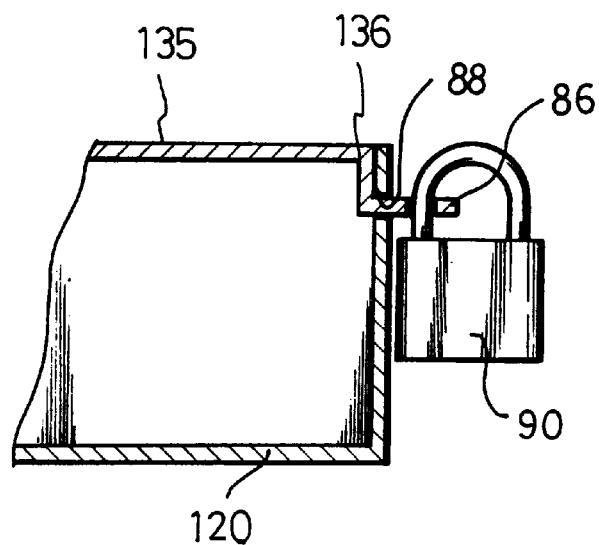
FIG. 8 is a sectional view illustrating the locked state of a security mechanism according to a second embodiment of the present invention.
Figure 9:
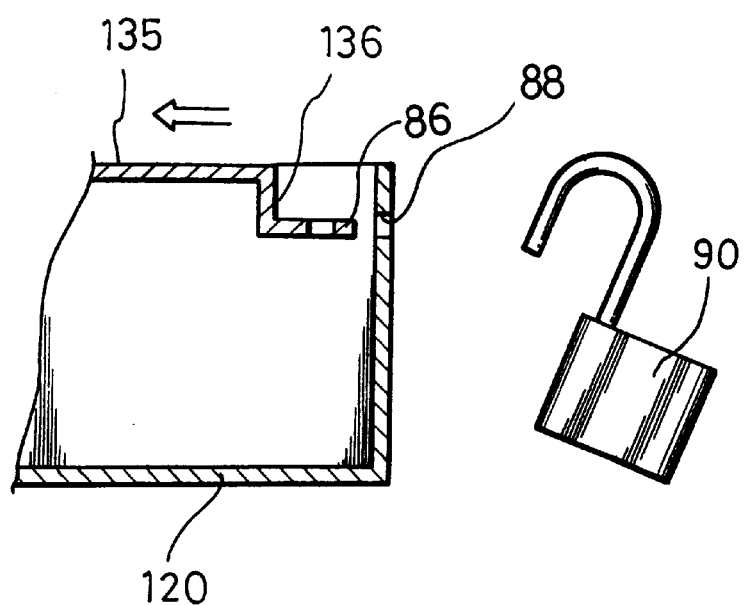
FIG. 9 is a sectional view illustrating the unlocked state of a security mechanism according to the second embodiment of the present invention.

FIG. 8 and FIG. 9 portray the second embodiment showing a security mechanism applicable to the present invention. In the second embodiment, locking tab 86 protrudes rearward from rear flange 136 of front upper cover assembly 130. Aperture 88 is positioned on second plate 126 of bottom plate member 120, so that locking tab 86 can be inserted into aperture 88 during assembly. Aperture 87 located near the rearward extremity of locking tab 86, allows padlock 90 to attach to tab 86 after tab 86 has been inserted through aperture 88. Padlock 90 prevents the inadvertent withdrawal of tab 86 from aperture 88, thus preventing the separation of front upper cover assembly 130 from bottom plate member 120.

In conclusion, bottom plate member 120 and front upper cover assembly 130 are assembled as shown in FIG. 2, and there is no need to use screws or tools when assembling the present invention. Therefore, the present invention achieves convenient assembling and disassembling and can increase assembling efficiency and improve productivity in the manufacturing process.

While the invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A process of manipulating a personal computer case, comprising:

assembling components of said personal computer case on a bottom side of a bottom assembly having bottom, front, and rear sides;

placing a front upper cover assembly having upper, front, left, right sides, and a rear flange on top of said bottom assembly with said front side of said front upper cover assembly extending in front of said front side of the bottom assembly, squeezing together said front side of said front upper cover assembly, to said rear side of said bottom assembly and thereby causing a locking tab protruding from said rear flange of said front upper cover assembly to slide through an aperture on said rear side of said bottom assembly while causing guide pins extending towards a rear of said front upper cover assembly to slide into corresponding guide holes in said bottom assembly and also causing a latching member attached to said front upper cover assembly to latch onto an edge of an aperture in said bottom assembly; and preventing the withdrawal of said locking tab from said aperture on said rear side of said bottom assembly by fastening a padlock on an extremity of said locking tab of said front upper cover assembly.

2. The process of claim 1, further comprising a step of inserting a protruding tab on a locking knob slidably attached to said front upper cover assembly into a socket in said button by sliding said locking knob toward said button.

3. The process of claim 2, further comprising a step of preventing a button for activating said latching member from being inadvertently depressed and thus preventing the inadvertent opening of said personal computer case by inserting a protruding tab on a locking knob slidably attached to said front upper cover assembly into a socket in said button, said protruding tab being inserted into said socket by sliding said locking knob vertically upwards toward said button.

4. A process of manipulating a personal computer case, comprising the steps of:

assembling components of said personal computer case on a bottom side of a bottom assembly having bottom, front, and rear sides;

placing a front upper cover assembly having upper, front, left, right sides, and a rear flange on top of said bottom assembly with said front side of said front upper cover assembly extending in front of said front side of the bottom assembly, squeezing together said front side of said front upper cover assembly, to said rear side of said bottom assembly and also causing a latching member attached to said front upper cover assembly to latch onto an edge of an aperture in said bottom assembly;

causing a guide pin extending towards a rear of said front upper cover assembly to slide into a corresponding guide hole in said bottom assembly;

causing a locking tab protruding from said rear flange of said front upper cover assembly to slide through an aperture on said rear side of said bottom assembly; and preventing the withdrawal of said locking tab from said aperture on said rear side of said bottom assembly by fastening a padlock on said locking tab of said front upper cover assembly.

5. The process of claim 4, further comprising a step of preventing a button for activating said latching member from being inadvertently depressed and thus preventing the inadvertent opening of said personal computer case by inserting a protruding tab on a locking knob slidably attached to said front upper cover assembly into a socket in said button, said protruding tab being inserted into said socket by sliding said locking knob toward said button.

6. A process of manipulating a personal computer case, comprising the steps of:

assembling components of said personal computer case on a bottom side of a bottom assembly having bottom, front and rear sides;

placing a front upper cover assembly having upper, front, left, right sides, and a rear flange on top of said bottom assembly with said front side of said front upper cover assembly extending in front of said front side of the bottom assembly, squeezing together said front side of said front upper cover assembly to said rear side of said bottom assembly, and also causing a latching member attached to said front upper cover assembly to latch onto an edge of an aperture in said bottom assembly;

causing a locking tab protruding from said rear flange of said front upper cover assembly to slide through an aperture on said rear side of said bottom assembly; and preventing the withdrawal of said locking tab from said aperture on said rear side of said bottom assembly by fastening a padlock on an extremity of said locking tab of said front upper cover assembly.

7. The process of claim 6, further comprising a step of preventing a button for activating said latching member from being inadvertently depressed and thus preventing the inadvertent opening of said personal computer case by inserting a protruding tab on a locking knob slidably attached to said front upper cover assembly into a socket in said button, said protruding tab being inserted into said socket by sliding said locking knob vertically upwards toward said button.

8. A process of manipulating a personal computer case, comprising the steps of:

assembling components of said personal computer case on a bottom side of a bottom assembly having bottom, front, and rear sides;

placing a front upper cover assembly having upper, front, left, right sides, and a rear flange on top of said bottom assembly with said front side of said front upper cover assembly extending in front of said front side of the bottom assembly, squeezing together said front side of said front upper cover assembly to said rear side of said bottom assembly, and also causing a latching member attached to said front upper cover assembly to latch onto an edge of an aperture in said bottom assembly; and preventing a button for activating said latching member from being inadvertently depressed and thus preventing the inadvertent opening of said personal computer case by inserting a protruding tab on a locking knob slidably attached to said front upper cover assembly into a socket in said button, said protruding tab being inserted into said socket by sliding said locking knob vertically upwards toward said button.

* * * * *